May 16, 1967  P. CHIAPPETTA, JR  3,319,914
MOVABLE TABLE ATTACHMENT FOR A MACHINE TOOL
Filed May 20, 1965
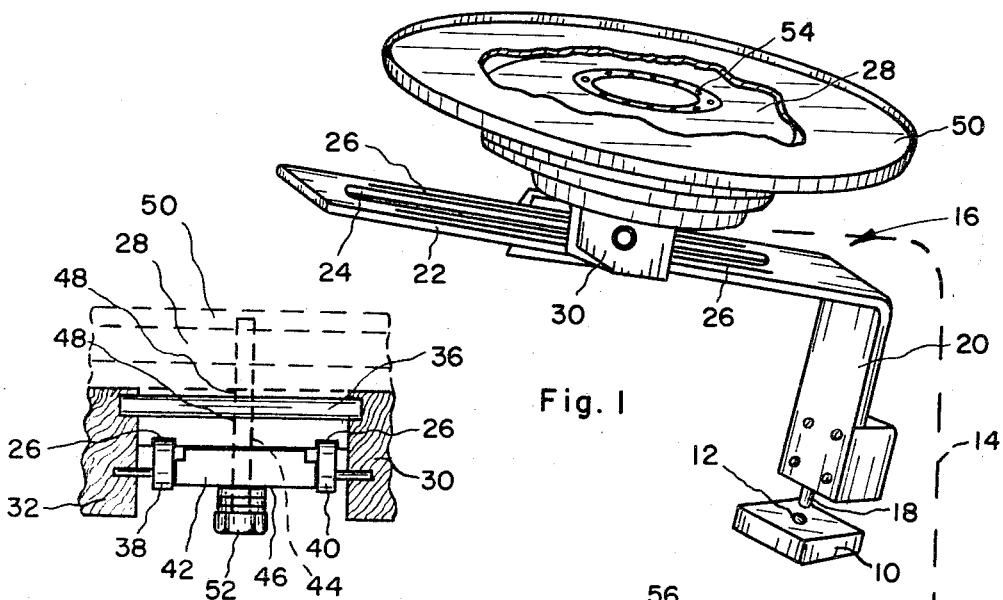
Fig. 1
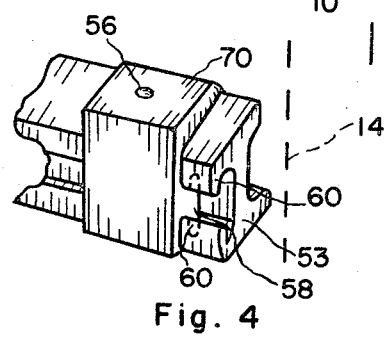
Fig. 3
Fig. 4
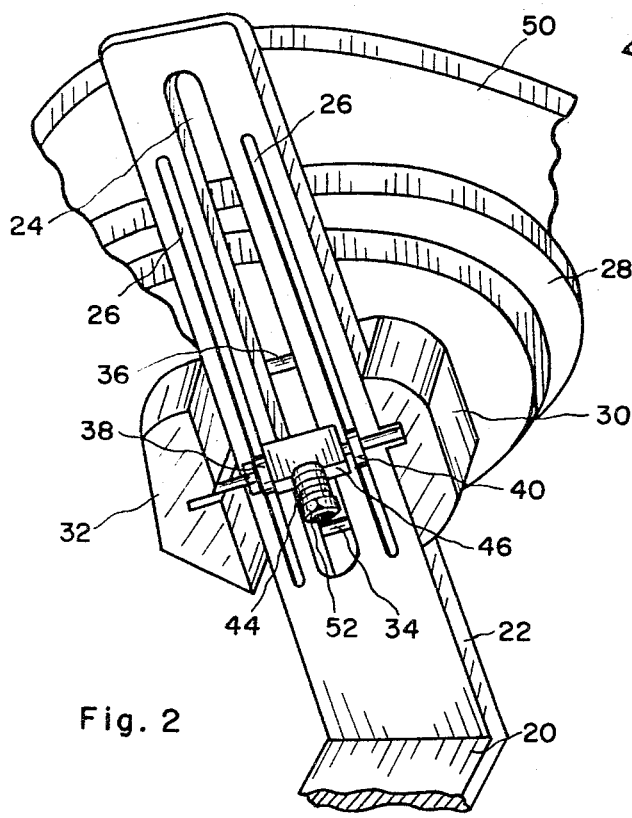
Fig. 2
INVENTOR.
PATSY CHIAPPETTA, JR.
BY Alfred E. Miller
ATTORNEY

# United States Patent Office 3,319,914
Patented May 16, 1967

3,319,914
MOVABLE TABLE ATTACHMENT FOR A MACHINE TOOL
Patsy Chiappetta, Jr., Snow Crystal Lane,
Stamford, Conn. 06905
Filed May 20, 1965, Ser. No. 457,322
3 Claims. (Cl. 248—205)

This invention relates to a tool and instrument holder or table which is particularly adapted for use with machine tools and especially for stand-up vertical machines such as a milling machine on which there is little space for the resting of various tools and instruments, for example, micrometers and gauges.

An object of the present invention is to provide a tool and instrument table which may be easily and rapidly attached and detached from conventional machine tools.

A further object of the present invention is to provide a tool and instrument holder or table which is pivotable, slideable and rotatable whereby the device may be brought close to the working area if desired and pushed away to a remote location from the machine tool, when not in use. Moreover, the present tool and instrument holder may be changed from machine to machine in a shop, depending upon need.

Another object of the present invention is to provide a tool and instrument holder or table which is slideable along a track for use on a horizontally disposed machine, such as a machine lathe.

A further object of the present invention is to provide a tool and instrument table which is lightweight yet durable and may be easily stored when not in use, taking up a minimum of space yet being reliably effective for the purposes intended.

The above and other features, objects and advantages of the present invention will be fully understood from the following description considered in connection with the accompanying illustrative drawings.

FIG. 1 is a perspective view being partially exploded of the present tool and instrument table affixed to a machine tool and constructed in accordance with the teachings of the present invention.

FIG. 2 is a partial perspective view of the present tool and instrument table taken from below the device and looking upwardly.

FIG. 3 is a cross-sectional view of the rollers, axle, wheels, pivot and arm of the present invention and FIG. 4 is a modification of the structure illustrated in FIG. 1 in which a track is shown having a sliding pivot element for the arm, said track being mounted on a horizontally disposed machine, such as a lathe.

Referring to the drawings and more particularly to FIGS. 1–3, the present invention constitutes a tool and instrument table for use with machine tools comprising a mount 10 having a hole 12 in the top surface thereof. The mount 10 is fixed preferably to the side surface of a vertically arranged machine tool, such as a milling machine shown in FIG. 1 in dotted lines, and bearing the reference numeral 14. An L-shaped elongated arm 16 is provided with a pin 18 on part 20 of the arm 16 which fits into hole 12 of the mount 10. The part 22 of the arm 16 is provided with an elongated slot 24 which is approximately centrally located, together with tracks 26 on either of side of slot 24. This can be clearly seen in FIG. 2.

A table support 28 is adapted to slide along the arm 16. The aforesaid table support 28 is provided with two spaced blocks 30 and 32 secured to the underside thereof. Journalled in spaced blocks 30 and 32 are rollers 34 and 36. Also journalled in spaced blocks 30 and 32 is a unit incorporating wheels 38 and 40 mounted on an axle 42. The latter unit is spaced from the rollers 34 and 36 a distance sufficient to permit the arm 16 to slide therebetween with a sliding fit. In this connection, the wheels 38 and 40 are engageable in the tracks 26 in the bottom of the arm 16 while the rollers 34 and 36 engage the top of arm 16 as clearly seen in FIG. 3. Moreover, a pivot pin 44 passes through the hole 46 in the axle 42 as well as the elongated slot 24 secured at one end 48 to the turntable top 50 and is fixed at the other end by means of a threadable nut 52. A ball bearing ring 54 is inserted in the center of the table support 28. This has the desirable effect of permitting the smooth rotation of table top 50 on the table support 28 even if the weight thereon is unevenly distributed.

It should be noted that the present turntable top 50 may be pivoted on pin 18, may be moved linearly on arm 16 with pivot pin 44 riding in the elongated slot 24; and may be rotated about the pivot pin 44. Consequently, the table top 50 may be brought close to the machine tool and rotated to bring the desired tool or gauge adjacent to the user's grasp or the table may be moved linearly away from the machine tool to a remote location when it is not necessary, and to keep the same out of the operator's way. In addition, the table may be changed from machine tool to machine tool providing said machine tools all have a mount 10.

FIG. 4 discloses a slightly different type of mount which is especially adapted for use on horizontally-disposed machines, such as a machine lathe. In this connection, a track 53 is provided on the side of the flat bed of the lathe. A mount 70 is provided with a hole 56 therein. In addition, the mount 70 is provided with a flange 58 that is adapted to fit behind the lips 60 of the track 53. Thus, the mount 70 is adapted to have the pin 18 of arm 16 inserted in hole 56 thereof whereby the table top 50 thereon may be moved together with the mount when the latter is slid along the track 53 to the desired position. Otherwise, the table top 50 pivots, slides and rotates in the same manner as the structure shown in FIGS. 1 and 2 and described hereinbefore.

While I have shown and described the preferred embodiment of my invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

What is claimed is:

1. In combination with a machine tool, a tool and instrument table comprising an elongated arm having an elongated slot therein, a track on either side of said slot, means on said machine tool for pivotally mounting said arm thereon, a rotatable table top having a pivot that is slideable in said slot, a pair of spaced guide members secured to the undersurface of said table top, roller members located in the area between said spaced guide members and in rolling engagement with both the top and bottom surfaces of said elongated arm, said guide members being movable along said elongated arm and the pivot of said table top being slideable in said slot whereby said table top may be moved over said arm from a position in proximity to said machine to a position remote therefrom, said table top being freely rotatable at any given time.

2. In combination with a machine tool, a tool and instrument table as set forth in claim 1 further comprising tracks in said arm on either side of said slot, and at least two of said roller members being wheels engageable and movable in said tracks.

3. In combination with a machine tool, a tool and instrument table comprising an elongated arm pivotally mounted on said machine tool in a cantilever manner, said arm having an elongated slot therein along the central axis thereof, a track on both sides of said slot, a rotatable table top having a pivot that is slidable in said slot, a pair of spaced guide members secured to the undersurface of said table top and movable along said elongated arm, roller members provided with an axle being journalled in said spaced guide members, said axle having a bore therethrough at right angles to the longitudinal axis of said axle, said pivot of the table top projecting through said bore, and means securing the free end of said pivot to said axle, said table top being adapted to move over said arm from a position in proximity to said machine tool to a position remote therefrom.

References Cited by the Examiner

UNITED STATES PATENTS

| | | | |
|---|---|---|---|
| 185,004 | 12/1876 | White | 248—287 |
| 1,630,925 | 5/1927 | Clover | 248—285 |
| 2,641,310 | 6/1953 | Simjian | 248—439 X |
| 2,903,047 | 9/1959 | Funyak | 248—430 |
| 2,932,480 | 4/1960 | Hardy | 248—285 |
| 3,170,666 | 2/1965 | Reiter et al. | 248—430 |

FOREIGN PATENTS 223,504    3/1958    Australia.

CLAUDE A. LE ROY, *Primary Examiner.*

CHANCELLOR E. HARRIS, *Examiner.*

R. P. SEITER, *Assistant Examiner.*